United States Patent
Takakuwa et al.

(10) Patent No.: US 9,229,137 B2
(45) Date of Patent: Jan. 5, 2016

(54) WIRE GRID POLARIZER COMPRISING TRANSPARENT PARTICLES, DISPLAY DEVICE INCLUDING THE SAME, AND METHOD OF FABRICATING THE WIRE GRID POLARIZER

(71) Applicant: Samsung Display Co., Ltd., Yongin (KR)

(72) Inventors: Atsushi Takakuwa, Hwaseong-si (KR); Jung Gun Nam, Seoul (KR); Moon Jung An, Seoul (KR); Eun Jung Kim, Suwon-si (KR); Gug Rae Jo, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 26 days.

(21) Appl. No.: 14/229,501

(22) Filed: Mar. 28, 2014

(65) Prior Publication Data

US 2015/0092140 A1 Apr. 2, 2015

(30) Foreign Application Priority Data

Oct. 2, 2013 (KR) .......................... 10-2013-0117882

(51) Int. Cl.
| | | |
|---|---|---|
| *G02F 1/1335* | (2006.01) | |
| *G02B 1/12* | (2006.01) | |
| *G02B 5/30* | (2006.01) | |
| *G02B 27/00* | (2006.01) | |

(52) U.S. Cl.
CPC ................ *G02B 1/12* (2013.01); *G02B 5/3058* (2013.01); *G02B 27/0006* (2013.01); *G02F 2001/133548* (2013.01)

(58) Field of Classification Search
CPC ................ G02F 2001/133548; G02B 5/3058; G02B 1/12
USPC ...................... 349/96, 97–103, 162
See application file for complete search history.

(56) References Cited

U.S. PATENT DOCUMENTS

| | | | |
|---|---|---|---|
| 6,288,840 | B1 | 9/2001 | Perkins et al. |
| 6,665,119 | B1 | 12/2003 | Kurtz et al. |
| 7,670,758 | B2 | 3/2010 | Wang et al. |
| 7,755,717 | B2 | 7/2010 | Zhang et al. |
| 2009/0153961 | A1 | 6/2009 | Murakami et al. |
| 2011/0102712 | A1* | 5/2011 | Kumai ........................... 349/96 |

FOREIGN PATENT DOCUMENTS

| | | |
|---|---|---|
| JP | 4497041 | 7/2007 |
| JP | 2010-145854 | 7/2010 |
| JP | 4501813 | 7/2010 |
| JP | 4654830 | 3/2011 |
| JP | 4688394 | 5/2011 |
| JP | 2011-158801 | 8/2011 |
| JP | 5045327 | 10/2012 |
| KR | 10-2012-0040868 | 4/2012 |
| KR | 10-1211734 | 12/2012 |

* cited by examiner

*Primary Examiner* — Paul Lee
(74) *Attorney, Agent, or Firm* — H.C. Park & Associates, PLC

(57) ABSTRACT

A wire grid polarizer including a substrate, parallel conductive wire patterns which protrude from a top surface of the substrate, non-conductive wire patterns which are formed on the conductive wire patterns, respectively, and a protective layer which is formed on the conductive wire patterns and the non-conductive wire patterns. The protective layer includes first transparent particles having a diameter greater than a period of the conductive wire patterns, and spaces between the conductive wire patterns are filled with air or are evacuated to form a vacuum.

17 Claims, 15 Drawing Sheets

WIRE GRID POLARIZER COMPRISING TRANSPARENT PARTICLES, DISPLAY DEVICE INCLUDING THE SAME, AND METHOD OF FABRICATING THE WIRE GRID POLARIZER

CROSS-REFERENCE TO RELATED APPLICATION

This application claims priority from and the benefit of Korean Patent Application No. 10-2013-0117882, filed on Oct. 2, 2013, which is hereby incorporated by reference for all purposes as if fully set forth herein.

BACKGROUND

1. Field

Exemplary embodiments of the present invention relate to a wire grid polarizer, a display device including the same, and a method of fabricating the wire grid polarizer.

2. Discussion of the Background

A wire grid consists of parallel conductive wires arranged to transmit only light of a specific polarization, from among electromagnetic waves transmitted thereto.

A wire grid structure having a period smaller than a wavelength of received unpolarized light, reflects light polarized in the direction of wires, and transmits light polarized in a direction perpendicular to the wires. Thus, the wire grid structure has the advantage in that the reflected polarized light may be reused, unlike an absorptive polarizer.

Because the wire grid structure is formed of a conductive material, it may react with an electrode, etc., inside a display device, thus causing the display device to malfunction. For this reason, a protective layer formed of a material having good thermal resistance may be coated on the wire grid structure.

In the process of forming the protective layer, however, spaces in the wire grid structure may be filled with the material having thermal resistance. In this case, transmittance and polarization characteristics of the wire grid structure are degraded, as compared with the state in which the spaces in the wire grid structure are filled with air.

FIGS. 1A and 1B illustrate that as a refractive index of spaces g in a wire grid and a refractive index t of a protective layer increase, the transmittance and extinction ratio of the wire grid in a visible range decrease.

The above information disclosed in this Background section is only for enhancement of understanding of the background of the invention and, therefore, it may contain information that does not constitute prior art.

SUMMARY

Exemplary embodiments of the present invention provide a wire grid polarizer having spaces formed therein that are filled with air, a display device including the wire grid polarizer, and a method of fabricating the wire grid polarizer.

Additional features will be set forth in part in the description which follows, and in part will be apparent from the description, or may be learned by practice of the invention.

An exemplary embodiment of the present invention discloses a wire grid polarizer including a substrate, parallel conductive wire patterns disposed on the substrate and protruding from a top surface of the substrate, non-conductive wire patterns disposed on the conductive wire patterns, and a protective layer disposed on the conductive wire patterns and the non-conductive wire patterns. The protective layer includes first transparent particles having a diameter greater than a period of the conductive wire patterns, and spaces between the conductive wire patterns are filled with air or are evacuated to form a vacuum.

An exemplary embodiment of the present invention also discloses a method of fabricating a wire grid polarizer, the method including forming a conductive material layer and a non-conductive material layer on a substrate, patterning the conductive material layer and the non-conductive material layer into wire patterns, and forming a protective layer, which includes transparent particles, on the wire patterns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1A:
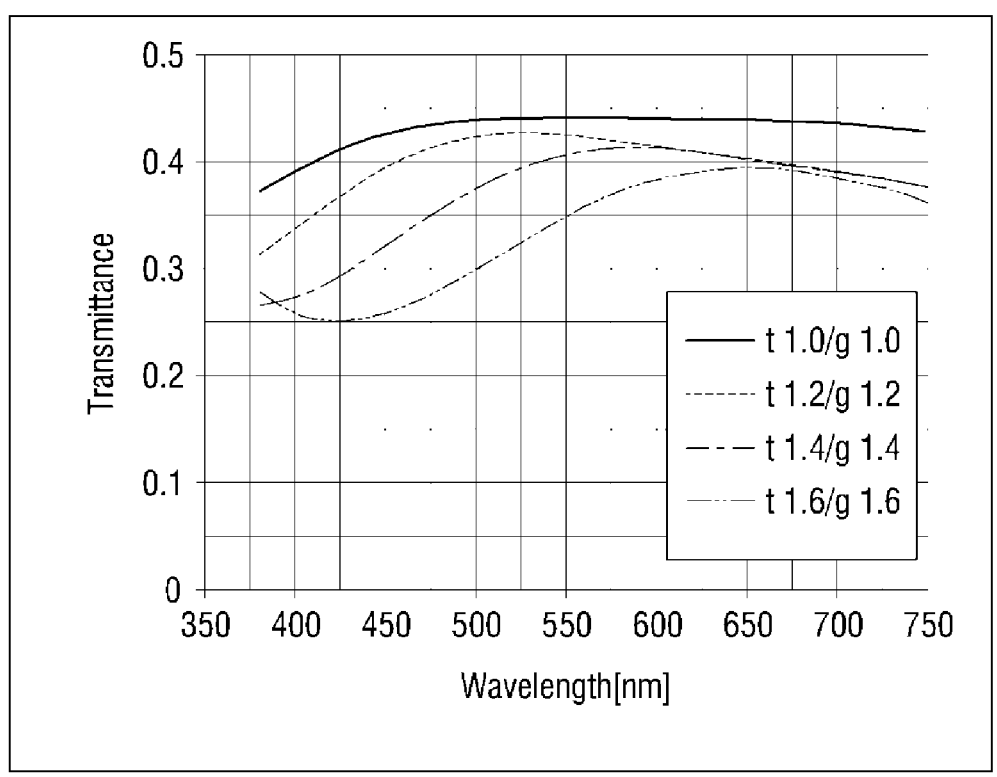
FIGS. 1A and 1B are graphs illustrating transmittances and extinction ratios of conventional wire grid polarizers with respect to the refractive indexes of the conventional wire grid polarizers.

The present invention will be described more fully hereinafter with reference to the accompanying drawings, in which exemplary embodiments of the invention are shown. This invention may, however, be embodied in many different forms and should not be construed as being limited to the embodiments set forth herein. Rather, these embodiments are provided so that this disclosure is thorough, and will fully convey the concept of the invention to those skilled in the art. In the drawings, the size and relative sizes of elements may be exaggerated for clarity. Like reference numerals in the drawings denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, exemplary embodiments of the present invention will be described with reference to the attached drawings.

Figure 2A:
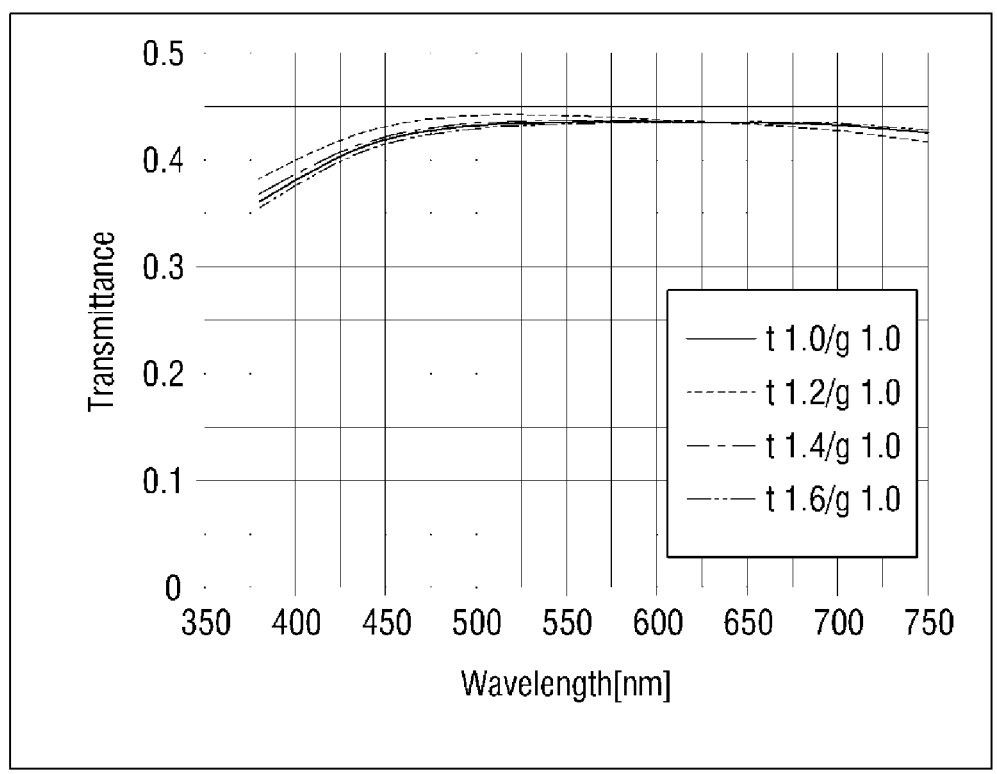
FIGS. 2A and 2B are graphs illustrating the transmittance and extinction ratio of a wire grid polarizer with respect to the refractive index of the wire grid polarizer according to an exemplary embodiment of the present invention.
Figure 2B:
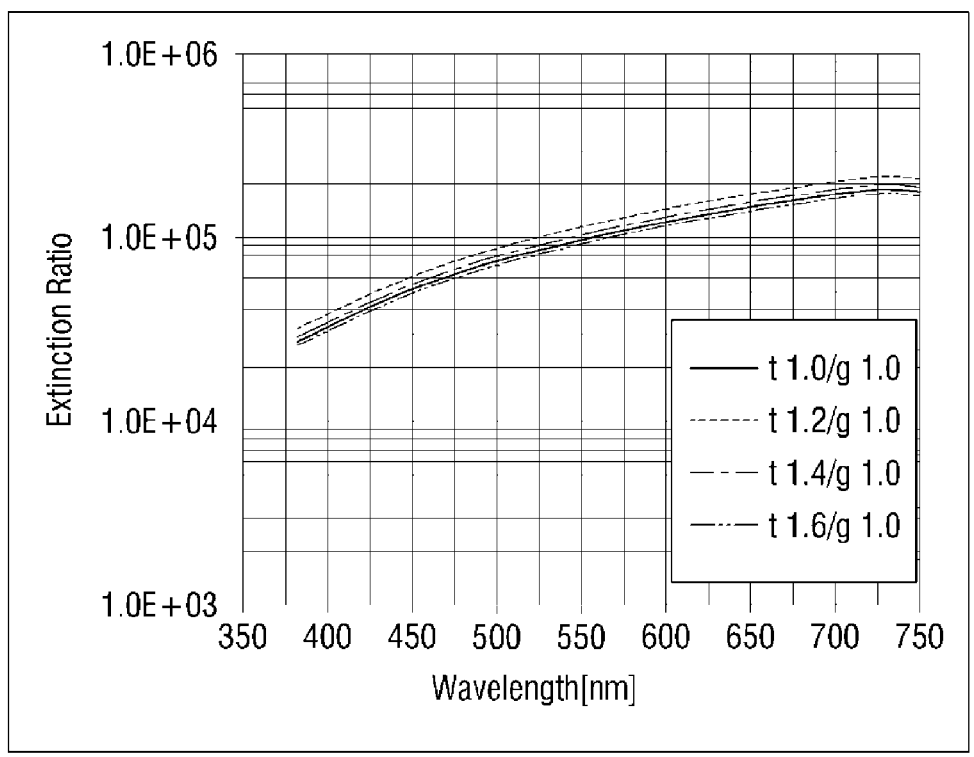

FIG. 2 is a graph illustrating the transmittance and extinction ratio of a wire grid polarizer according to an exemplary embodiment of the present invention with respect to the refractive index of the wire grid polarizer.

Referring to FIG. 2, when the refractive index of spaces g in a wire grid is constantly at 1.0, the transmittance and extinction ratio of the wire grid hardly change even if a refractive index t of a protective layer increases to 1.2, 1.4 or 1.6. That is, it can be seen that maintaining the spaces g of the wire grid filled with air or are evacuated to form a vacuum affects the transmittance and polarization characteristics of the wire grid.

Figure 3:
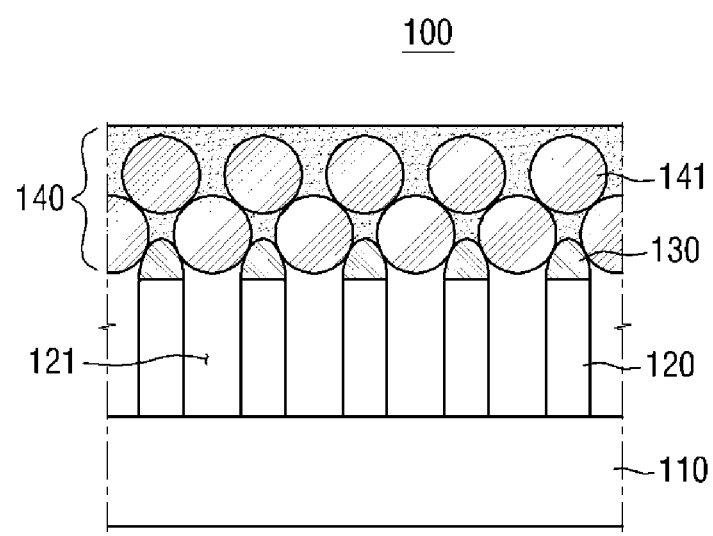
FIG. 3 is a cross-sectional view of a wire grid polarizer according to an exemplary embodiment of the present invention.
Figure 4:
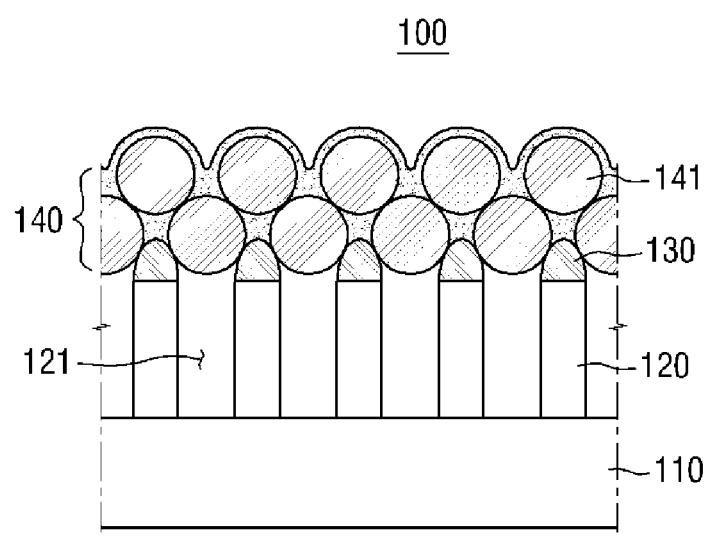
FIG. 4 is another cross-sectional view of the wire grid polarizer according to the exemplary embodiment of the present invention.

FIG. 3 is a cross-sectional view of a wire grid polarizer 100 according to an exemplary embodiment of the present invention. FIG. 4 is another cross-sectional view of the wire grid polarizer according to the exemplary embodiment of the present invention.

Referring to FIG. 3, the wire grid polarizer 100 includes a substrate 110, parallel conductive wire patterns 120 which protrude from a top surface of the substrate 110, non-conductive wire patterns 130 which are respectively formed on the conductive wire patterns 120, and a protective layer 140 which is formed on the conductive wire patterns 120 and the non-conductive wire patterns 130. The protective layer 140 includes first transparent particles 141 having a diameter greater than a period of the conductive wire patterns 120. Herein, particle diameters may refer to the average particle size of the corresponding particles. Spaces 121 between the conductive wire patterns 120 may be filled with air or be are evacuated to form a vacuum.

The material that forms the substrate 110 may be selected according to the purpose or process as long as it can transmit visible light. Examples of the material may include, but are not limited to, various polymers such as glass, quartz, acrylic, triacetyl cellulose (TAC), cyclic olefin copolymer (COP), cyclic olefin polymer (COC), polycarbonate (PC), polyethylene naphthalate (PET), and polyethersulfone (PES). The substrate 110 may be formed of an optical film material having a specific degree of flexibility.

The conductive wire patterns 120 may be arranged at a preselected period on the substrate 110 to be parallel to each other. When the period of the conductive wire patterns 120 is shorter than a wavelength of incident light, the wire grid polarizer 100 may have a high polarization extinction ratio.

However, the shorter the period, the more difficult it becomes to fabricate the wire grid polarizer 100. A visible light spectrum generally ranges from 380 to 780 nm. A wire grid polarizer should have a period of at least 200 nm or less in order to have a high extinction ratio for the three primary colors (i.e., red, green and blue) of light. Only then can polarization characteristics be expected. The wire grid polarizer 100 may have a period of 120 nm or less in order to exhibit polarization performance equal to or better than that of a conventional polarizer.

The conductive wire patterns 120 can be formed of any conductive material. In an exemplary embodiment, the conductive wire patterns 120 may be formed of a metal material. More specifically, one, or an alloy containing one, metal selected from the group consisting of aluminum (Al), chrome (Cr), silver (Ag), copper (Cu), nickel (Ni), cobalt (Co), and molybdenum (Mo), may be used to form the conductive wire patterns 120, or they may be formed of a stacked structure of these metals or alloys containing these metals.

A width of the conductive wire patterns 120 may be, but is not limited to, in a range of 10 to 200 nm as long as the conductive wire patterns 120 can exhibit polarization performance. In addition, a thickness of the conductive wire patterns 120 may be, but is not limited to, in a range of 10 to 500 nm.

The non-conductive wire patterns 130 may be formed on the conductive wire patterns 120. A width of the non-conductive wire patterns 130 may be smaller than or equal to the width of the conductive wire patterns 120, and a thickness of the non-conductive wire patterns 130 may be, but is not limited to, in a range of 10 to 300 nm.

A cross-section of the non-conductive wire patterns 130 may be quadrangular, triangular, semicircular, or semi-elliptical. However, the cross-sectional shape of the non-conductive wire patterns 130 is not limited to the above examples. Each of the non-conductive wire patterns 130 may also have a different cross-sectional shape in each thickness section thereof.

The non-conductive wire patterns 130 may be formed of a non-conductive transparent material. In an exemplary embodiment, the non-conductive transparent material may be, but is not limited to, a polymer, an oxide, or a nitride. More specifically, the oxide may be a silicon oxide, and the nitride may be a silicon nitride.

The non-conductive wire patterns 130 formed on the conductive wire patterns 120 may prevent the first transparent particles 141 of the protective layer 140 from penetrating the spaces between the conductive wire patterns 120. That is, the first transparent particles 141 may not exist in the spaces 121 formed by connecting upper ends of the conductive wire patterns 120. In this case, because the spaces 121 between the conductive wire patterns 120 are filled with air or are evacuated to form a vacuum, the wire grid polarizer 100 may have a superior transmittance and extinction ratio as described above with reference to FIG. 2.

The first transparent particles 141 of the protective layer 140 have a diameter greater than the period of the conductive wire patterns 120. Thus, even if the first transparent particles 141 are formed on the conductive wire patterns 120 and the non-conductive wire patterns 130, they cannot invade the spaces 121 between the conductive wire patterns 120. Accordingly, the spaces 121 can be filled with air.

Too large an average diameter of the first transparent particles 141 can reduce the transmittance of the wire grid polarizer 100. Therefore, an appropriate diameter may be selected as desired. The selected average diameter of the first transparent particles 141 may be inversely proportional to the thickness of the non-conductive wire patterns 130. For example, if the thickness of the non-conductive wire patterns 130 is equal to or greater than the period of the conductive wire patterns 120, a desired structure can be obtained when the diameter of the first transparent particles 141 is equal to or greater than the period of the conductive wire patterns 120. On the other hand, if the non-conductive wire patterns 130 are thin, the above structure can be formed only when the diameter of the first transparent particles 141 is much greater than the period of the conductive wire patterns 120.

The first transparent particles 141 may be formed of a non-conductive transparent material. In an exemplary embodiment, the non-conductive transparent material may be, but is not limited to, a polymer, an oxide, or a nitride. More specifically, the oxide may be a silicon oxide, and the nitride may be a silicon nitride. In another exemplary embodiment, a refractive index of the first transparent particles 141 may be equal to a refractive index of the non-conductive wire patterns 130.

The protective layer 140 may additionally include, e.g., a binder to fix the first transparent particles 141.

Referring to FIG. 4, a top surface of the protective layer 140 need not be planarized but may have a raised, uneven structure revealing the shape of the first transparent particles 141. In this case, the wire grid polarizer 100 including the protective layer 140 may be used as an upper polarizer of a liquid crystal display (LCD) to prevent reflection of external light.

Figure 5:
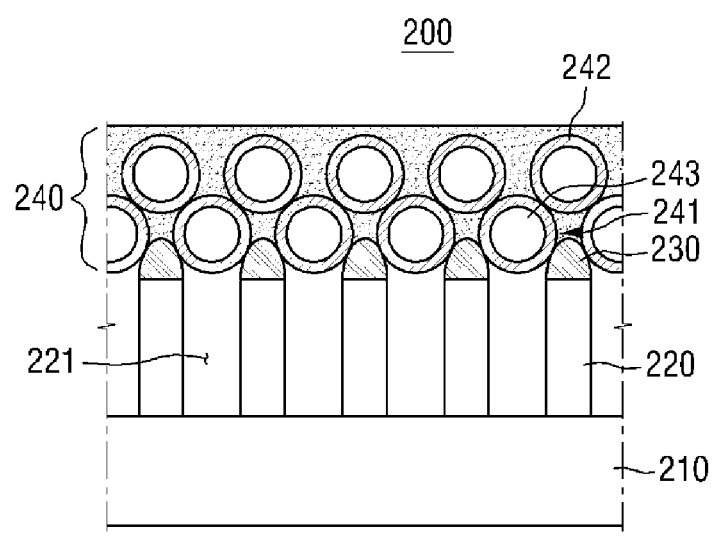
FIG. 5 is a cross-sectional view of a wire grid polarizer according to another exemplary embodiment of the present invention.

FIG. 5 is a cross-sectional view of a wire grid polarizer 200 according to another exemplary embodiment of the present invention.

Referring to FIG. 5, first transparent particles 241 included in a protective layer 240 of the wire grid polarizer 200 may have a hollow structure, and the interior 243 of each of the first transparent particles 241 having the hollow structure may be filled with air or are evacuated to form a vacuum. The first transparent particles 241 having the hollow structure may improve the transmittance of the wire grid polarizer 200. In an exemplary embodiment, even if some of the first transparent particles 241 having the hollow structure are sunken into spaces between conductive wire patterns 220, a reduction in the transmittance and extinction ratio of the wire grid polarizer 200 may not be perceptible.

Figure 1B:
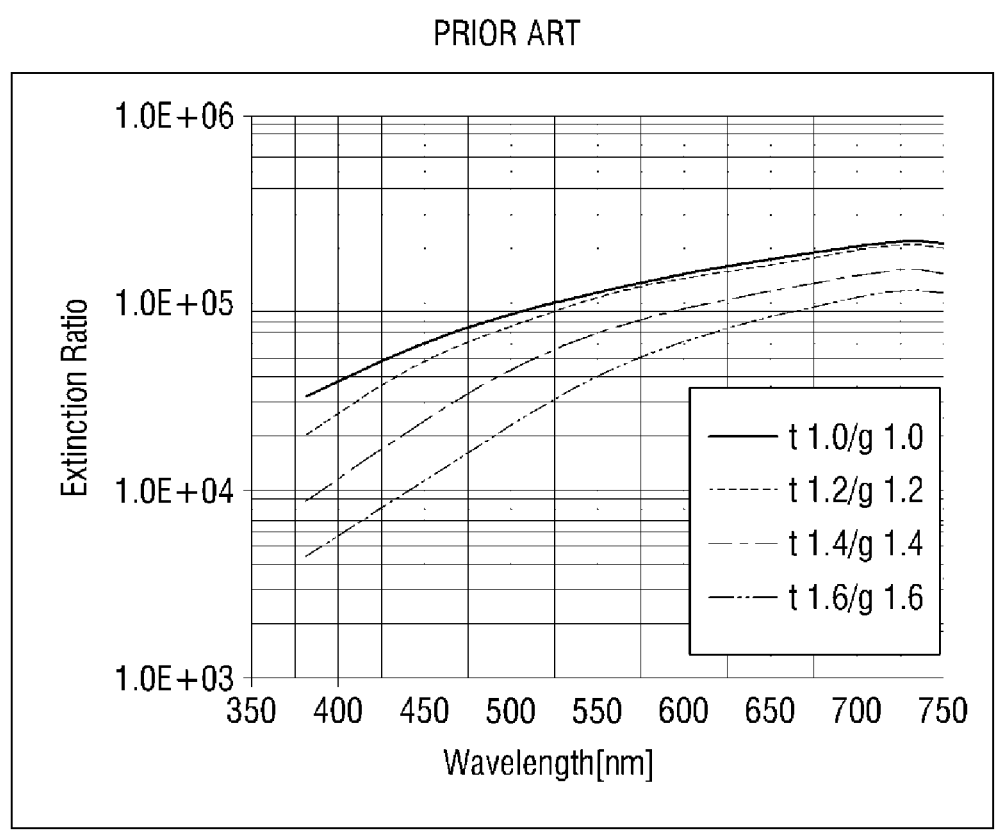

Similar to the first transparent particles 141 of FIG. 1, an outside layer 242 of each of the first transparent particles 241 may be formed of a non-conductive transparent material, such as a polymer, an oxide, a nitride, etc. The outside layer 242 of each of the first transparent particles 241 may have the same refractive index as non-conductive wire patterns 230.

Other elements of FIG. 5 are the same as or correspond to the elements of FIG. 3, and thus, a redundant description thereof will be omitted.

Figure 6:
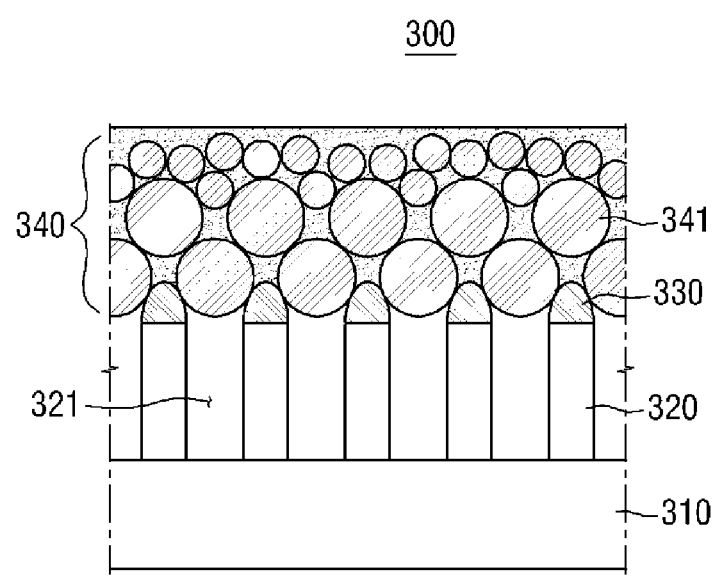
FIG. 6 is a cross-sectional view of a wire grid polarizer according to another exemplary embodiment of the present invention.

FIG. 6 is a cross-sectional view of a wire grid polarizer 300 according to another exemplary embodiment of the present invention.

Referring to FIG. 6, first transparent particles (341, 342) included in a protective layer 340 of the wire grid polarizer 300 may include large particles 341 having an average diameter greater than a period of conductive wire patterns 320, and small particles 342 having an average diameter relatively less than the average diameter of the large particles 341. If the first transparent particles (341, 342) have too large of an average diameter, transmittance may be reduced, as described above. Therefore, the average diameter of the first transparent particles (341, 342) may be reduced. In addition, the large first transparent particles 341 having a diameter greater than the period of the conductive wire patterns 320 may be placed in contact areas between the conductive wire patterns 320 and non-conductive wire patterns 330, and the small transparent particles 342 may be placed on the first transparent particles 341.

Other elements of FIG. 6 are the same as or correspond to the elements of FIG. 3, and thus, a redundant description thereof will be omitted.

Figure 7:
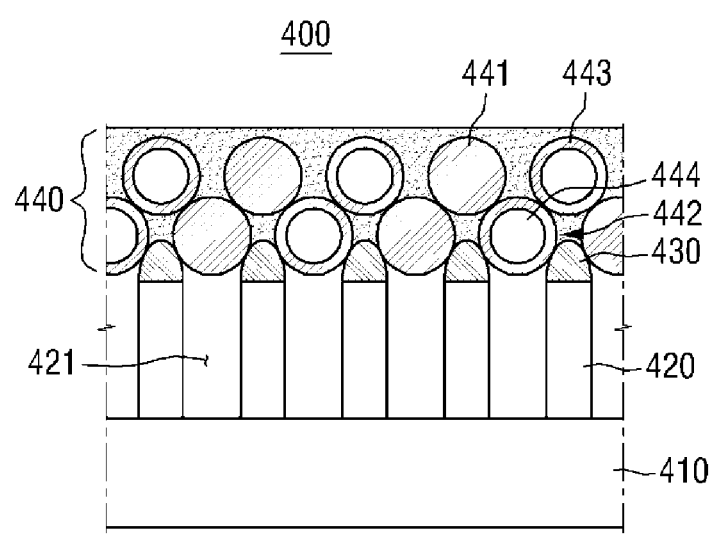
FIG. 7 is a cross-sectional view of a wire grid polarizer according to another exemplary embodiment of the present invention.

FIG. 7 is a cross-sectional view of a wire grid polarizer 400 according to another exemplary embodiment of the present invention.

Referring to FIG. 7, first transparent particles (441, 442) included in a protective layer 440 of the wire grid polarizer 400 may include solid particles 441 and hollow particles 442. Each of the hollow particles 442 may consist of an outside layer 443 and an interior space 444 filled with air or are evacuated to form a vacuum. The solid particles 441 and the outside layer 443 of each of the hollow particles 442 may be formed of any material described above with reference to FIGS. 3 and 5.

Although not shown in FIG. 7, in an exemplary embodiment, the solid particles 441 and the hollow particles 442 may be used in combination. Solid and hollow particles 441 and 442 having a diameter greater than an period of conductive wire patterns 420 may be placed in contact areas between the conductive wire patterns 420 and non-conductive wire patterns 430, and solid and hollow particles 441 and 442 having a relatively smaller diameter may be placed on the above solid and hollow particles 441 and 442.

Other elements of FIG. 7 are the same as or correspond to the elements of FIG. 3, and thus, a redundant description thereof will be omitted.

Figure 8:
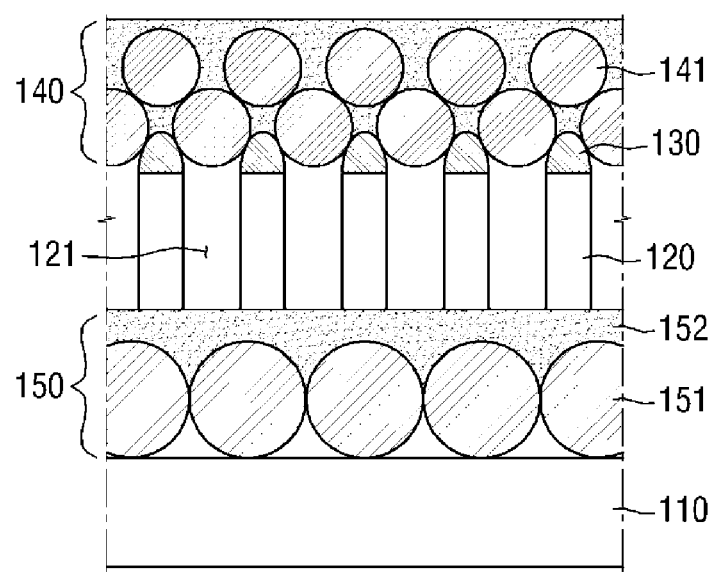
FIG. 8 is a cross-sectional view of a wire grid polarizer according to another exemplary embodiment of the present invention.

FIG. 8 is a cross-sectional view of a wire grid polarizer 101 according to another embodiment of the present invention.

Referring to FIG. 8, the wire grid polarizer 101 may additionally include a diffusion layer 150 formed between a substrate 110 and conductive wire patterns 120. To uniformly diffuse incident light, the diffusion layer 150 may include second transparent particles 151 and a filler 152 which surrounds the second transparent particles 151.

A diameter of the second transparent particles 151 may be smaller than a wavelength of visible light. In this case, visible light may be diffused more uniformly as it passes through the second transparent particles 151. That is, the second transparent particles 151 may have a diameter of less than 380 nm.

The second transparent particles 151 may be formed of a non-conductive transparent material. In an exemplary embodiment, the non-conductive transparent material may be, but is not limited to, a polymer, an oxide, or a nitride. More specifically, the oxide may be a silicon oxide, and the nitride may be a silicon nitride. In another exemplary embodiment, a refractive index of the second transparent particles 151 may be equal to a refractive index of the filler 152.

Other elements of FIG. 8 are the same as or correspond to the elements of FIG. 3, and thus a redundant description thereof will be omitted.

Figure 9:
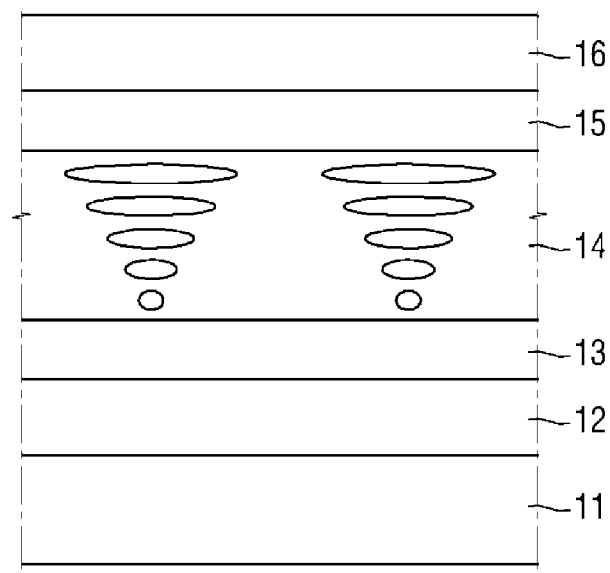
FIG. 9 is a mimetic cross-sectional view of a liquid crystal display (LCD) according to an exemplary embodiment of the present invention.

FIG. 9 is a mimetic cross-sectional view of an LCD 10 according to an exemplary embodiment of the present invention.

Referring to FIG. 9 together with FIGS. 3 through 8, the LCD 10 includes a backlight unit 11 which emits light, a liquid crystal panel (13, 14, 15) which is stacked on the backlight unit 11 and includes a lower substrate 13, a liquid crystal layer 14 and an upper substrate 15, and an upper polarizer 16 and a lower polarizer 12 which are disposed on opposing sides of the liquid crystal panel (13, 14, 15). If the two polarizers 16 and 12 are disposed on opposing sides of the liquid crystal panel (13, 14, 15), transmission axes of the upper and lower polarizers 16 and 12 may be orthogonal or parallel to each other.

In FIG. 9, the upper polarizer 16 and the lower polarizer 12 are disposed on opposing sides of the liquid crystal panel (13, 14, 15). In some cases, however, the upper polarizer 16 may be omitted.

Although not shown in detail, the backlight unit 11 may further include a light guide plate (LGP), one or more light source units, a reflective member, an optical sheet, etc.

The LGP changes the path of light generated by the light source units toward the liquid crystal layer 14. The LGP may have an incident surface upon which light generated by the light source units is incident, and an exit surface which faces the liquid crystal layer 14. The LGP may be formed of, but not limited to, a light-transmitting material, such as polymetyl methacrylate (PMMA), or a material having a constant refractive index, such as polycarbonate (PC).

Light incident upon one side or both sides of the LGP, which is formed of the above materials, has an angle smaller than a critical angle of the LGP. Thus, the light is delivered into the LGP. When the light is incident upon an upper or lower surface of the LGP, an angle of incidence of the light is greater than the critical angle of the LGP. Thus, the light is evenly delivered within the LGP without exiting the LGP.

Scattering patterns may be formed on any one (e.g., the lower surface facing the exit surface) of the upper and lower surfaces of the LGP, such that light guided by the LGP can travel upward. That is, the scattering patterns may be printed on one surface of the LGP using, e.g., ink such that light delivered within the LGP can travel upward. The scattering patterns may be printed with ink. However, the present invention is not limited thereto, and fine grooves or protrusions can be formed on the LGP, as well as other modifications.

The reflective member may further be provided between the LGP and a bottom portion of a lower housing. The reflective member reflects light output from the lower surface (i.e., a surface opposite the exit surface of the LGP) of the LGP back to the LGP. The reflective member may be in the form of, but not limited to, a film.

The light source units may be placed to face the incident surface of the LGP. The number of the light source units can be changed as desired. For example, one light source unit may be placed on one side surface of the LGP, or three or more light source units may be placed to correspond to three or more side surfaces of the LGP. In addition, one or more light source units can be placed to correspond to any one of the side surfaces of the LGP. While the side-light type backlight unit 11, in which one or more light sources are placed on one or more side surfaces of the LGP, has been described above, a direct-type backlight unit, a surface light source type, etc. can also be used depending on the backlight configuration.

A white light-emitting diode (LED), which emits white light, may be provided as a light source. LEDs, which emit red light, green light, and blue light, may also be provided as light sources. If a more than one light source is implemented as LEDs, which emit red light, green light, and blue light, respectively, it is possible to realize white light through color mixture by turning on the LEDs simultaneously.

The lower substrate 13 may be a thin-film transistor (TFT) substrate. Although not shown specifically in FIG. 9, the lower substrate 13 may include TFTs which are disposed on a substrate formed of a transparent insulating material, such as glass or plastic, and pixel electrodes which are electric field-generating electrodes. Each of the TFTs includes a gate electrode, a gate insulating layer, a semiconductor layer, an ohmic contact layer, and source/drain electrodes, and the pixel electrodes are formed of a transparent conductive oxide, such as indium tin oxide (ITO) or indium zinc oxide (IZO).

The upper substrate 15 may be a color filter substrate. Although not shown specifically in FIG. 9, the upper substrate 15 may include a black matrix for preventing leakage of light; red, green, and blue color filters; and a common electrode, which is an electric field-generating electrode. The black matrix is formed on a lower surface of a substrate formed of a transparent insulating material, and the common electrode is formed of a transparent conductive oxide, such as ITO or IZO.

A plastic substrate that can be used for the lower substrate 13 and the upper substrate 15 may be, but is not limited to, a polyethylene terephthalate (PET), polycarbonate (PC), polyimide (PI), polyethylene naphthalate (PEN), polyether sulfone (PES), polyarylate (PAR), or cycloolefin copolymer (COC) substrate. In addition, the lower substrate 13 and the upper substrate 15 may be formed of a flexible material.

The liquid crystal layer 14 rotates a polarization axis of incident light. The liquid crystal layer 14 is aligned in a preselected direction and positioned between the upper substrate 15 and the lower substrate 13. A mode of the liquid crystal layer 14 may be a twisted nematic (TN) mode, a vertical alignment (VA) mode or a horizontal alignment mode (in-plane switching (IPS), fringe-field switching (FFS)).

The lower polarizer 12 and the upper polarizer 16 may be the wire grid polarizers described above with reference to FIGS. 3 through 8. If any one of the wire grid polarizers of FIGS. 3 through 8 is used as the upper polarizer 16, a raised, uneven structure formed on a top surface of the wire grid polarizer due to first transparent particles can reduce reflection of external light.

An LCD has been described above as an example. However, the present invention is also applicable to an organic light-emitting display, which does not include a light source and an LGP, or a plasma display.

Figure 10:
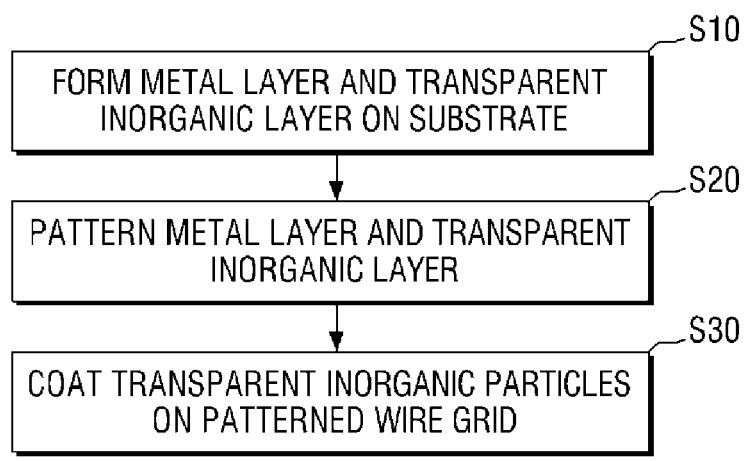
FIG. 10 is a flowchart illustrating a method of fabricating a wire grid polarizer according to an exemplary embodiment of the present invention.
Figure 11A:
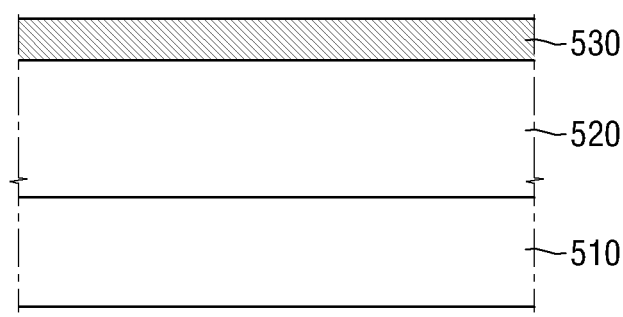
FIGS. 11A through 11C are cross-sectional views respectively illustrating operations in the fabrication method of FIG. 10.
Figure 11B:
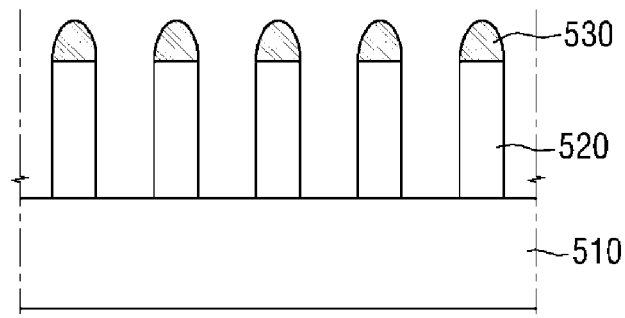
Figure 11C:
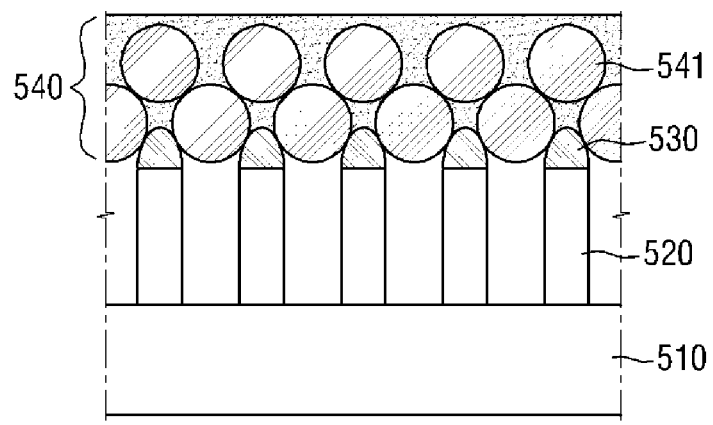

FIG. 10 is a flowchart illustrating a method of fabricating a wire grid polarizer according to an exemplary embodiment of the present invention. FIGS. 11A through 11C are cross-sectional views respectively illustrating each of steps S10, S20, and S30 in the fabrication method of FIG. 10.

Referring to FIGS. 10 through 11C, the method of fabricating a wire grid polarizer according to an exemplary embodiment may include forming a conductive material layer 520 and a non-conductive material layer 530 on a substrate 510 (operation S10), patterning the conductive material layer 520 and the non-conductive material layer 530 into wire patterns (operation S20), and forming a protective layer 520, which includes transparent particles 541, on the wire patterns (operation S30).

The forming of the conductive material layer 520 and the non-conductive material layer 530 (operation S10) may use a sputtering method, a chemical vapor deposition (CVD) method, an evaporation method, etc.

In the patterning of the conductive material layer 520 and the non-conductive material layer 530 into the wire patterns (operation S20), the conductive material layer 520 and the non-conductive material layer 530 may be patterned separately. Alternatively, after the conductive material layer 520 and the non-conductive material layer 530 are formed, they may be etched using one mask and thus, patterned into the wire patterns. In this case, dry etching or wet etching may be used.

The forming of the protective layer 540 (operation S30) may include coating mixed slurry, which contains the transparent particles 541, a binder (not shown), and a solvent (not shown), on conductive material patterns and non-conductive material patterns, and baking the coated slurry.

The solvent in the slurry should be used to such a degree that it can mix the transparent particles 541 and the binder. In addition, the solvent can be of any type as long as it can evaporate in the baking process. In an exemplary embodiment, a material whose boiling point is a baking temperature or below may be selected from organic solvents used in a general process and used as the solvent.

In some cases, a curing process may be additionally performed after the baking process. For example, if silicon oxide is used as the transparent particles 541, an Si—O—Si bridging reaction may occur, thereby promoting the stability of the protective layer 540. The curing process may be achieved by a thermal curing process, a photocuring process, or the thermal curing process and the photocuring process.

The disclosed exemplary embodiments make it possible to maintain the performance of various devices, such as a TFT, without degrading the transmittance and polarization characteristics of a wire grid polarizer. In addition, if the wire grid polarizer is used as an upper polarizer, an LCD having improved reflection-preventing performance can be provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A wire grid polarizer comprising:
a substrate;
conductive wire patterns extending in parallel and protruding from a top surface of the substrate;
non-conductive wire patterns disposed on the conductive wire patterns; and
a protective layer disposed on the conductive wire patterns and the non-conductive wire patterns,
wherein:
the protective layer comprises first transparent particles formed separately from the non-conductive wire patterns, at least one of the first transparent particles being configured to contact two adjacent non-conductive wire patterns, the first transparent particles having an average diameter greater than a period of the conductive wire patterns; and
spaces between the conductive wire patterns are filled with air or are evacuated to form a vacuum.

2. The wire grid polarizer of claim 1, wherein the protective layer does not penetrate the spaces between the conductive wire patterns.

3. The wire grid polarizer of claim 1, wherein the first transparent particles comprise hollow particles.

4. The wire grid polarizer of claim 3, wherein the first transparent particles are hollow particles.

5. The wire grid polarizer of claim 1, wherein the protective layer further comprises additional transparent particles disposed on the first transparent particles, the additional transparent particles having a smaller diameter than the first transparent particles.

6. The wire grid polarizer of claim 1, wherein the non-conductive wire patterns and the first transparent particles have the same refractive index.

7. The wire grid polarizer of claim 1, wherein the conductive wire patterns comprise at least one metal selected from the group consisting of aluminum (Al), chrome (Cr), silver (Ag), copper (Cu), nickel (Ni), cobalt (Co) and molybdenum (Mo).

8. The wire grid polarizer of claim 1, wherein the period of the conductive wire patterns ranges is greater than 0 nm and less than or equal to 120 nm.

9. The wire grid polarizer of claim 1, further comprising a diffusion layer comprising second transparent particles disposed between the substrate and the conductive wire patterns.

10. The wire grid polarizer of claim 9, wherein an average diameter of the second transparent particles less than a wavelength range of visible light.

11. The wire grid polarizer of claim 9, wherein:
the diffusion layer further comprises a filler surrounding the second transparent particles; and
the second transparent particles and the filler have the same refractive index.

12. The wire grid polarizer of claim 1, wherein a top surface of the protective layer comprises a raised, uneven structure formed by the first transparent particles.

13. A liquid crystal display (LCD) comprising:
a backlight unit configured to emit light;
a liquid crystal panel disposed on the backlight unit and comprising:
a lower substrate;
a liquid crystal layer; and
an upper substrate; and
the wire grid polarizer of claim 1 disposed on or under the liquid crystal panel.

14. A method of fabricating a wire grid polarizer, the method comprising:
forming a conductive material layer and a non-conductive material layer on a substrate;
patterning the conductive material layer and the non-conductive material layer into wire patterns; and
forming a protective layer comprising transparent particles formed separately from the material layers, at least one of the transparent particles being configured to contact two adjacent wire patterns.

15. The method of claim 14, wherein the patterning of the conductive material layer and the non-conductive material layer comprises an etching process using a mask.

16. The method of claim 14, wherein the forming of the protective layer comprises:
coating mixed slurry comprising the transparent particles, a binder, and a solvent; and
baking the coated slurry.

17. A liquid crystal display (LCD) comprising:
a backlight unit configured to emit light;
a liquid crystal panel disposed on the backlight unit and comprising:
a lower substrate;
a liquid crystal layer; and
an upper substrate; and
the wire grid polarizer of claim 1 disposed on and under the liquid crystal panel.

* * * * *